United States Patent [19]
Weber

[11] Patent Number: 5,757,162
[45] Date of Patent: May 26, 1998

[54] METHOD AND APPARATUS FOR OPERATING AN ELECTRIC INDUCTION MOTOR WITH A LONG AND LOSSY EXTENSION CORD

[76] Inventor: Harold J. Weber, P.O. Box 6161, 560 Washington St., Holliston, Mass. 01746

[21] Appl. No.: 620,850

[22] Filed: Feb. 28, 1996

[51] Int. Cl.$^6$ .................................................. H02P 1/34
[52] U.S. Cl. ...................... 318/821; 318/798; 318/815; 318/776; 318/729; 318/531
[58] Field of Search .................................. 318/798–815, 318/821, 776, 729, 531

[56] References Cited

U.S. PATENT DOCUMENTS

5,041,775  8/1991  Erdman ................................. 318/812
5,159,255  10/1992 Weber .................................. 318/812 X

*Primary Examiner*—Karen Masih

[57] ABSTRACT

An alternating current induction motor having a multitapped RUN winding and including a controller which automatically determines an instant tap selection in response to changes in applied a.c. electric power voltage level appearing immediately at the motor terminals. A measure of instant level of the motor terminal voltage is utilized to automatically reselect the RUN winding tap selection in order to maintain a near constant level of magnetic excitation in the stator field irrespective of immediate changes or variations in the available motor terminal voltage. Electric lawn mowers, power tool motors and other heavily loaded motors which may normally be operated at the end of various lengths of especially long and lossy extension cords or the like may advantageously utilize my control technique to maintain operation with an about normal and constant level of power, independent from usual performance degrading voltage drop losses commonly encountered in the extension cord. Appliances which use induction motors, such as air conditioners and refrigerators, may run with better electrical efficiency in presence of poor line voltage regulation due to inadequate wiring, or intentional brown-out conditions, while maintaining nearly constant operational performance.

20 Claims, 6 Drawing Sheets

METHOD AND APPARATUS FOR OPERATING AN ELECTRIC INDUCTION MOTOR WITH A LONG AND LOSSY EXTENSION CORD

PRIOR ART STATEMENT

My U.S. Pat. No. 5,159,255 for an *Energy Conserving Electric Induction Motor Field Control Method and Apparatus* and other patents mentioned as references in my patent are herewith cited merely for general information. I am not currently cognizant of any other previous patents or other prior art particularly relating to the unique teachings of this invention.

BACKGROUND OF MY INVENTION

Common commercial grade electric induction motors operate with best efficiency when the applied motor terminal voltage is held to be within about 5% of the design center voltage rating for the motor. When applied voltage greatly exceeds the motor's rating, core loss in the stator core structure rises rapidly due to near saturation of the core's magnetic structure particularly in cheap grade, fully rated motors used in major appliances and other consumer oriented products). As a result, hysteresis and eddy current losses rapidly increase, motor efficiency suffers and the motor may overheat or eventually burn out. Conversely, when applied voltage drops below the motor's design value rating, the stator field strength quickly drops and resulting motor torque is substantially reduced. As a consequence, the motor may become overloaded whereupon the excess load induced drag on the rotor may cause the slip speed to markedly increase, resulting in a rapid buildup of losses in the rotor as well as in the stator portion of the motor. Below normal motor voltage is ordinarily more detrimental to motor performance and life than a similar amount of overvoltage. In other words, for a typical induction motor rated for 115 volts a.c. input, applying 127 volts (10% high) to the motor introduces less liklihood for motor failure than what applying 103 volts (10% low) will cause. A primary reason for this is that, with lower than normal voltage, the available horsepower and shaft torque rapidly drops off and in effect the motor becomes apparently "overloaded" with what would ordinarily be an acceptable load under normal voltage operation. The following BASIC language computer program allows finding approximate horsepower variation with 10% deviation about a motor's design value or rated terminal voltage.

```
10 REM motperf1.bas ver. 1.0 (c)11/24/95 H.Weber K1VTW
20 REM ------------------------------------
30 CLS:REM Microsoft GW-BASIC Syntax
40 LOCATE 6
50 INPUT "Enter Motor Rating Horsepower:   ";HP
60 PRINT
70 INPUT "Enter Motor Rating Voltage:   ";LV
80 HPA=HP*1.21:HPB=HP*.81
90 LVA=LV+(LV*.1):LVB=LV-(LV*.1)
100 PRINT STRING$(50,"-"):PRINT
110 PRINT "Low Line Voltage-10%:         ";LVB
120 PRINT " Resulting Motor Horsepower:  ";HPB;"HP"
130 PRINT:PRINT
140 PRINT "High Line Voltage + 10%:      ";LVA
150 PRINT " Resulting Motor Horsepower:  ";HPA;"HP"
160 END:REM finis
```

In the past, major electrically powered lawn care machines such as electric lawn mowers have been introduced, but so far they have failed to find even a modest, let alone widespread, extent of consumer acceptance. General performance and customer satisfaction with electric mowers has never matched that of a simple gasoline engine powered mower except for the smallest, well groomed yards. More commonplace yards with tough grass, lots of weeds, crabgrass, sticks and twigs, leaves, uneven surfaces and other irregular imperfections make for poor electric mower performance, usually as a result of limited reserve power especially for battery operated mowers which may experience rapid battery discharge. Line operated universal (e.g., series wound) motors have occasionally been used for these kinds of lawn care machine applications. Universal motors have a structurally complex wound rotor including a commutator and a set of brushes, resulting in a more expensive construction than that of an ordinary induction motor. Under continuous and heavily loaded operation, a universal motor is prone to rapid brush wearout due to high sustained commutator current., thereby requiring more frequent maintenance by a qualified repair person. A universal motor also inherently sacrifices performance when the applied voltage drops below normal, attest the variable speed feature often built into handtools such as electric drills, wherein the motor voltage is intentionally reduced to limit motor speed and torque. A further drawback of universal motors is that they operate with best performance (e.g., horsepower development) when running at relatively high rotor (e.g., output shaft member) speeds. Such preferably high shaft speeds are in contradiction to the desired speed limits necessarily imposed upon a blade of a lawnmower, for example. Ordinarily, lawn mowers (using gasoline engines, for instance) are intentionally limited in speeds not in excess of about 3,600 r.p.m. to avoid blade damage from excess tip velocity and centrifugual force considerations. As a result, a geared down universal motor might be considered, but cost and reliability factors outweigh any advantage otherwise offered by the universal motor.

An induction motor, on the other hand, affords excellent intrinsic speed control and offers good torque and performance at the preferred blade speeds. An inexpensive two pole induction motor is inherently limited to less than 3,600 r.p.m. shaft speed (from 60 hertz power) and can be expected to perform well in the range of 3,200–3,500 r.p.m. This is near optimum rotational speed for an ordinary lawn mower blade. When an induction motor of ordinary design is used in an electric lawn mower it may suffer from widely varying motor terminal voltage because the lawn mower may commonly be operated in conjunction with an extraordinarily long extension cord. Seventyfive feet or more is not an unusual length for such a cord while, for the sake of economy and cord flexibility, the wire guage of the cord may be far less than optimum for the size of the lawn mower's motor. The result is a large voltage drop which introduces a large loss of mower power and may create motor stalling. As a result of this operational shortcoming, induction motors have heretofore been less apt to be used in lawn mowers in spite of their inherent (and time proven) reliability, simplicity to maintain, constant (and safe) speed and quietness. For a 75 foot extension cord utilizing 16 awg copper conductors and feeding a motor drawing about 12 amperes, a 6.2% voltage drop results in about 107.8 volts at the motor from a 115 volt a.c. line. This amount of voltage drop produces substantial loss of available motor power and useful blade cutting ability. Unfortunately, when the most power is needed (as in thick grass), the motor current increases and wasteful extension cord voltage drop also increases, resulting in less motor power when actually more is needed. At other times, the motor may be running with a very light load and motor current is modest, resulting is what could become excessive motor voltage and unecessary motor heating and inefficiencies wrought by eddy current and winding copper losses. I realized that if the excitation level of the motor could at least be kept near its intended design value, the motor would perform better, be smaller for the same level of performance, be cheaper and be lighter in weight. My invention results in an inexpensive solution to this preferable condition, resulting in a practical motor design which may be used over a wide range of applied voltage with little loss in operational performance.

FIELD OF MY INVENTION

My invention relates to the field of electric alternating current induction motor apparatus and more particularly to such motors used with a widely varying applied motor terminal voltage and a widely fluctuating driven load. In particular my invention relates to fully rated commercial grade fractional and integral horsepower induction motors of cheap design used in applications where the applied motor terminal voltage tends to substantially decrease as the driven load increases due to poor regulation of the power source or losses intrinsic with the wiring interconnecting the power source with the motor.

ENERGY CONSERVATION

Use of a dynamic motor controller which reduces a motor's power demand as load decreases contributes a substantial improvement to efficiency and reduced energy consumption. Increasing a motor's impedance as the driven load decreases serves to reduce iron losses in the motor's core materials (stator and rotor structure) and copper losses in the motor's windings. Energy reduction improvements of 10–30% have been observed over what the typical performance of an uncontrolled motor under partial load conditions may show.

ENVIRONMENTAL CONSERVATION

Ordinary gasoline powered lawnmowers typically employ 4 cycle engines rated between 3 and 5 horsepower. Such small one lung engines are believed to cause about 5% of the overall air polution released in the United States, together with an immeasurable level of noise pollution and disturbance. A commonplace 3.5 horsepower gasoline engine of typical design (found on many 20–22 inch lawnmowers used by homeowners) is said to emit about the same amount of hydrocarbons in one hour of grass cutting as does a new car driven about 340 miles. In yet another perspective, the *California Air Resource Board* alleged that annual pollution emissions from small engines (i.e., lawn mowers and the like) in that state alone is equivalent to about 3.5 million new cars running a distance of 16,000 miles each (about one year's average driving). Aside from exhaust pollution, the *Environmental Protection Agency* estimates that about 17 million gallons of gasoline are spilled each year in the United States just refueling these kinds of small gasoline utility engines.

This is more spillage than the total amount spilled by the Exxon Valdez tanker in the Gulf of Alaska in 1989. (Re: *TIME Magazine*, Jul. 4, 1994, page 62.)

Battery powered electric lawn machines and in particular lawn care mowers are heralded as having potential to go a long way towards reducing this wasteful and dangerous hydrocarbon pollution and neighborhood noise. Aside from being substantially more costly, battery powered lawn mowers also experience severely limited performance and they are also likely to produce an insidious disposal problem when enevitable battery replacement becomes necessary. A potential for millions of relatively large chemical laden discarded batteries can become a landfill manager's nightmare as well as serving to raise the ire of the environmentalist community.

Conventional electrically powered lawn care machines, i.e. those which operate without a battery and operate directly from common a.c. utility power through a extension cord, show substantial promise for energy conservation and an ability for producing less pollution. Since no expensive batteries are needed, lawn mowers and other equipment using conventional electrical power can be manufactured and sold without a price premium relative with the prior art of gasoline engine powered lawn care equipment. Unecessary waste does occur in existing lawn care machines having induction motors using utility power since a long extension cord is normally needed (as with a lawn mower) and considerable power drop occurs in the cord. As a result of this foreknowledge, manufacturers typically scale the motor to a nominal voltage condition with the result that if a longer or shorter cord, or a cord with smaller or larger conductors is used, the motor will operate with reduced efficiency, limited workload performance and result in wasted energy.

Safety of line powered electric lawnmower operation using a long extension cord is no longer a significant problem when the power source is properly derived through a GFI or ground fault interrupter protected outlet or adapter, as commonly required by contemporary electrician codes. Even if the extension cord is carelessly cut-off by the lawnmower, the operator's safety is not jeopardized because the GFI device will simply "kick out", stopping power flow to the lawnmower.

DESCRIPTION OF RELATED ART

In my U.S. Pat. No. 5,159,255 for an *Energy Conserving Electric Induction Motor Field Control Method and Apparatus* dynamic control of a multitapped RUN winding induction motor is taught which operates to change tap selection in response to detected variation in LOAD demand. Mechanical motor load sensing is determined by measuring changes in the induction motor's intrinsic slip speed or operating power factor. It was therefore the primary goal of the invention of my '255 patent to readjust motor winding tap selection in response to changes in the sensed level of instantaneous motor shaft loading (determined by changes in motor speed or power factor) and thereby minimize motor current draw and substantially reduce overall power consumption.

SUMMARY

My instant invention intends to maintain a nearly constant level of motor stator field excitation irrespective of exceptionally wide variations in voltage level of a.c. power applied to the motor's terminals. In certain applications for which my invention is ideally suited, the variation in available a.c. power tends to vary inversely with motor loading, e.g. the available motor terminal voltage level drops as the motor's mechanical output shaft loading increases. A particularly acute example of this undesirable operating condition occurs when a common induction motor is connected to a far end of a long extension cord. This is absolutely the wrong operating condition necessary to obtain reasonable performance in shaft power and efficiency from any common type of induction motor design. Attest that most motor manufacturers warn against operating with long or undersized extension cords. Enter now my invention, which senses the decrease in available a.c. voltage level and readjusts tap selection on a multitapped RUN winding portion of the induction motor. For illustrative example, the motor has a 115 volt a.c. RUN winding design which is suitably tapped for 100 volts and 85 volts. A typical tap arrangement (assuming a full winding rating of 115 volts) is near 93% of the full winding turns for 100 volts and about 86% of the full winding turns for 85 volts.

Ordinary electric induction motors operate best at their rated voltage. The same motors generally work well (at least for short periods of time) with 10-15% elevated voltage, although losses may increase. Unfortunately, induction motors exhibit a strong deterioration in performance with even a modest decrease in applied voltage, a condition which can quickly lead to burnout (or at least severe overheating) in a hard working, heavily loaded motor. In lawn mowers and other similar kinds of portable motor applications, long extension cords may be commonly used in order to extend a.c. power to the location where the motor is being utilized. For example, in a lawn mower application it would not be unusual to utilize 100 or 200 feet of extension cord to reach the extremes of even a modest lot from an outdoor outlet. Light weight extension cords are more convenient, easier to use, drag along more easily, and are definitely preferable in a highly portable application such as lawn mowing. Therefore, undersized guages of extension cords are actually more desirable from a practical convenience point of view. Hence, instead of using a heavy awg-12 guage conductor sized cord, an awg-16 guage (or even a lighter weight awg-18 guage) cord may be preferable. The lighter guage cord is also inherently far less expensive. A BASIC language computer program which follows will quickly compute the longest extension cord which might be used to tolerate different voltage drop levels as well as quantifying actual drop to be expected in an extension cord of a specified length.

```
10 REM cordlen2.bas ver. 1.0 (c)12/14/95 H.Weber K1VTW
20 REM ------------------------------------
30 CLS:REM GW-BASIC Syntax
40 BAR$=STRING$(72,"-"):BARR$=STRING$(72,"=")
50 PRINT" MAXIMUM EXTENSION CORD LENGTH";
60 PRINT "RELATIVE WITH TOLERABLE VOLTAGE DROP"
70 PRINT BARR$:PRINT
80 W18=6.39/500:W16=4.02/500:W14=2.53/500
90 W12=1.59/500:W10=.99/500
100 INPUT "ENTER - Motor Current Rating: ";MI
110  IF MI<1 OR MI>25 THEN 30 ELSE PRINT BAR$
120 INPUT " AC Power Source Voltage: ";ACV
130  IF ACV<24 OR ACV>250 THEN 30 ELSE PRINT BAR$
140 INPUT " Guage of Cord (AWG): ";WG
150  IF WG=18 THEN WGR=W18:GOTO 210
160  IF WG=16 THEN WGR=W16:GOTO 210
170  IF WG=14 THEN WGR=W14:GOTO 210
180  IF WG=12 THEN WGR=W12:GOTO 210
190  IF WG=10 THEN WGR=W10:GOTO 210
200 GOTO 30
210 VLA=ACV*.15:VLB=ACV*.3:VLC=ACV*.02:VLD=ACV*.05
220 PRINT BAR$
230 INPUT" Length of Cord (Ft.): ";LC
240  IF LC<0 OR LC>2140 THEN 30 ELSE PRINT BAR$
250 VCD=INT(10*MI*(LC*WGR))/10:PCTVD=INT(1000*VCD/ACV)/10
260 FOR A=1 TO 2140
270  IF MI*(A*WGR)=>VLC AND FLC=0 THEN CLC=A:FLC=1
280  IF MI*(A*WGR)=>VLD AND FLD=0 THEN CLD=A:FLD=1
290  IF MI*(A*WGR)=>VLA AND FLA=0 THEN CLA=A:FLA=1
300  IF MI*(A*WGR)=>VLB AND FLB=0 THEN CLB=A:FLB=1
310  IF FLA=1 AND FLB=1 THEN 320 ELSE NEXT A
320 PRINT" For 2% Voltage Drop, Max Cord: ";
330 PRINT CLC;"Feet; Motor Voltage=";INT(ACV*.98);"VAC"
340  IF CLD=0 THEN 430 ELSE PRINT BAR$
350 PRINT" For 5% Voltage Drop, Max. Cord:";
360 PRINT CLD;" Feet; Motor Voltage=";INT(ACV*.95);"VAC"
370  IF CLA=0 THEN 430 ELSE PRINT BAR$
380 PRINT " For 15% Voltage Drop, Max. Cord: ";
390 PRINT CLA" Feet; Motor Voltage=";INT(ACV*.85);"VAC"
400     IF CLB=0 THEN 430 ELSE PRINT BAR$
410 PRINT" For 30% Voltage Drop, Max Cord: ";
420 PRINT CLB;" Feet; Motor Voltage=";INT(ACV*.7);"VAC"
430 PRINT BAR$:IF LC<6 THEN 460
440 PRINT " For a";LC;"foot cord, Voltage Drop=";VCD;
450 PRINT "volts, about";PCTVD;"percent":PRINT BAR$
460  END:REM finis
```

OBJECTIVES

An object of my invention is to maintain constant running torque in an induction motor in presence of widely varying and inherently unstable motor terminal voltage.

Another object for my invention is to enable operation of an induction motor, such as that which might be used with the compressor of an air conditioner or refrigerator, from a poorly regulated source of a.c. utility power which might include exceptionally lossy building wiring.

A goal of my invention is to allow usage of larger fractional and small integral horsepower electric induction motors with a maximum level of performance efficiency while operating at the end of a lengthy, intentionally undersized and extraordinarily lossy extension cord.

Yet another purpose for my invention is to teach a motor operating with an about constant level of performance when supplied from an a.c. utility power circuit that includes inadequate wiring and inherently poor voltage regulation.

Still another object of my invention is to teach an induction motor controller which maintains the motor's instantaneous ampere/turn field strength to be held quasiconstant between predetermined bounds in presence of substantial voltage drop between the a.c. power source and the motor's terminal.

A particular object for my invention is to enable an electric induction motor to be used with minimal sacrifice of rotational torque and general performance at the extreme end of a long and lossy extension cord without a substantial sacrifice of motor power and overall performance.

DESCRIPTION OF DRAWINGS

My invention is depicted on 6 sheets of drawings including 6 illustrative figures.

DESCRIPTION OF INVENTION

Figure 1:
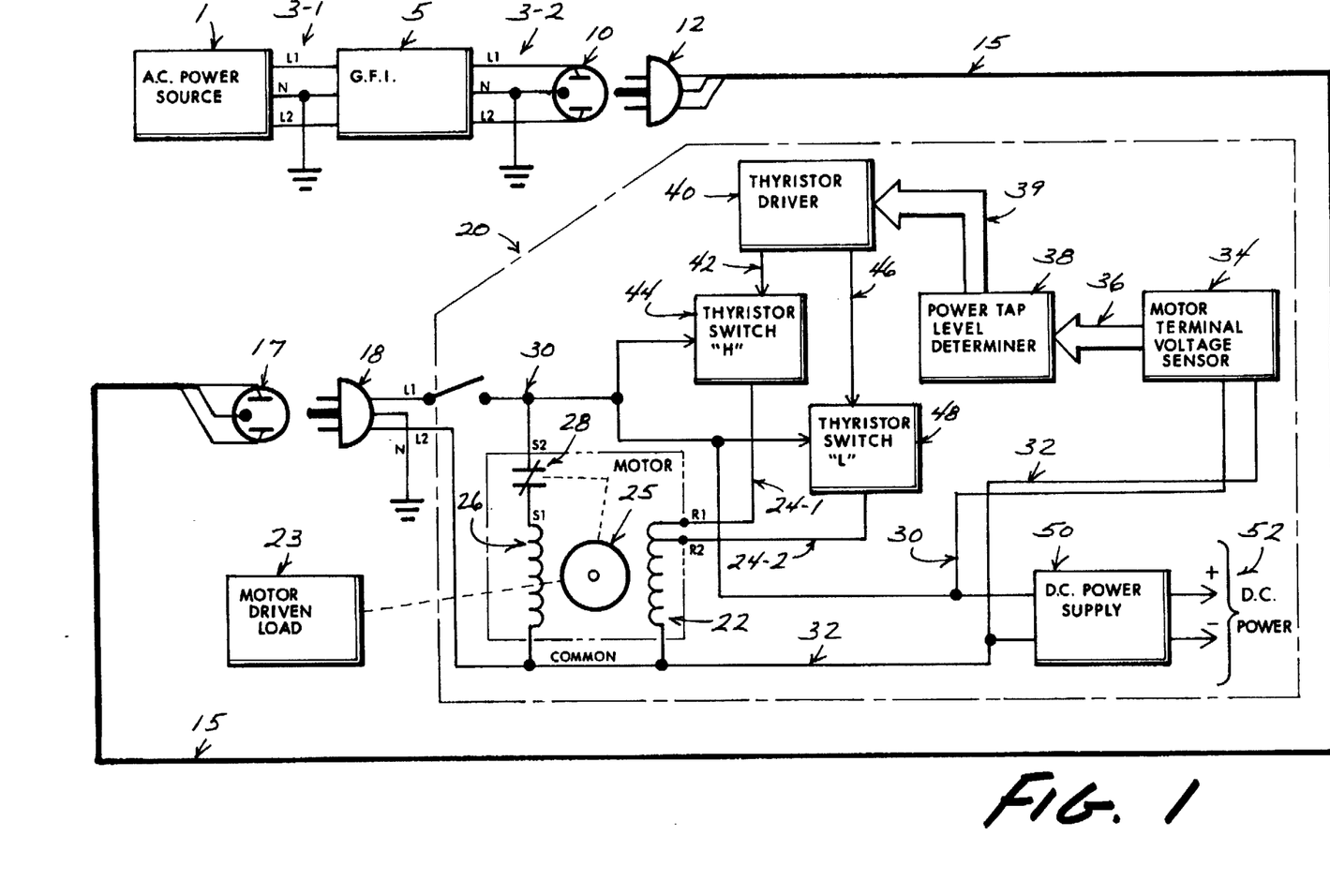
FIG. 1—Invention operating in conjunction with a long extension cord.

An AC power source 1 (such as commercial utility power) provides AC power on lines 3-1 in FIG. 1. A ground fault interrupter (GFI) 5 may be included as good safety practice and as a requirement in some code jurisdictions. AC power flows on lines 3-2 to a receptacle 10. A plug 12 end of a long and inherently lossy extension cord 15 feeds a receptacle end 17. A typical extension cord 15 may be several hundred feet in length, with 25 to 100 feet as a most common for many outdoors applications. The wire guage is usually between about 14 a.w.g. and 18 a.w.g., with the smaller guage (e.g., 16 or 18 a.w.g.) being preferable for movable applications such as lawn mowers, due to its lighter weight and higher flexibility which makes it more suitable for "dragging along".

The motor and motor control system is included within the bounded area 20. A plug 18 accepts AC power supplied from the end of the extension cord 15. The hot side of the line L1 couples through a switch with line 30, while the other side of the line L2 couples with common line 32. A motor terminal voltage sensor 34 receives AC power on lines 30,32 and produces a signal on line 36 which is related to the level of the supplied AC power. A power tap level determiner 38 operates to produce signals on line 39 which controls a thyristor driver 40. In typical operation and when operating from a nominal 117 volt AC line, the signal on line 39 may be a first level when the supplied AC power on lines 30,32 is above about 105 volts and a second level when the supplied AC power on lines 30,32 is less than 105 volts. A first level signal on line 39 enables the thyristor driver 40 to deliver a gating signal on line 42 turning a thyristor switch 44 ON and coupling the supplied AC power on line 30 with line 24-1, the R1 input of the motor run winding 22. Alternatively, when the second level signal appears on line 39 thyristor driver 40 disables thyristor switch 44 and enables thyristor switch 48, coupling the supplied AC power on line 30 with line 24-2 and the R2 tap input of the motor run winding 22. The motor includes a rotor 25 coupled with a load 23. A start winding 26 is coupled through a centrifugal switch 28 which opens when the motor operation approaches full speed. This configuration is known in the art as a split phase motor. It shall be known that equivalent operation may be obtained with a variety of motor configurations known in the art, including capacitor start, capacitor run, repulsion and shaded pole constructions and the starting devices aside from a centrifugal switch, may include current relays, potential relays and a variety of solid state starters, or in the case of certain motor designs such as permanent capacitor start types, may require no starting device whatsoever. Motor configuration, for purpose of my invention, is considered merely an engineering choice and therefore unaffects the scope of my invention. DC power for general circuit operation is provided by a DC power supply 50 on terminal lines 52.

Figure 2:
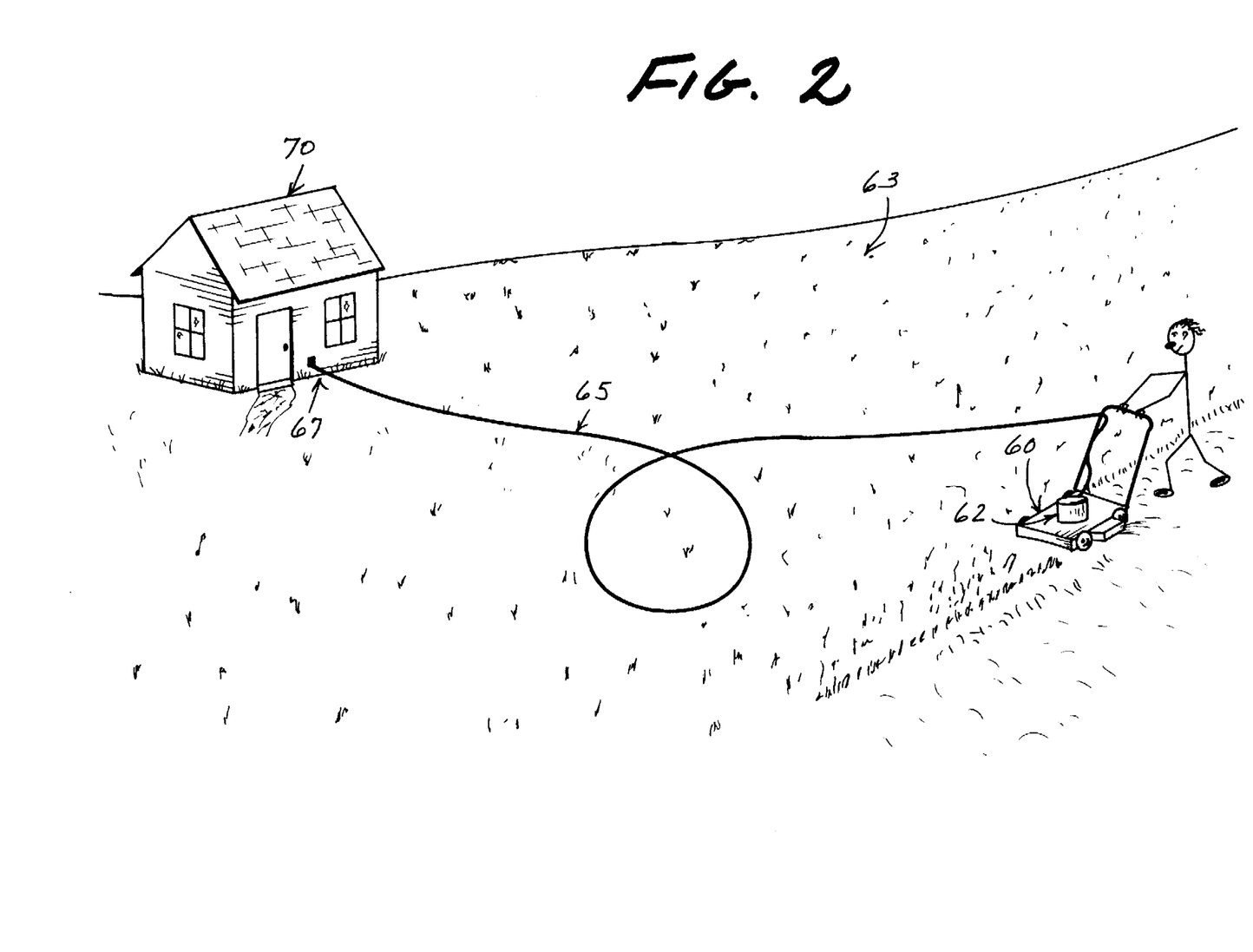
FIG. 2—Electric lawncare machine operating with long extension cord.

In FIG. 2, I show an application for my invention with an electric lawn care machine, e.g. a lawnmower 60 including an electric induction motor 62. Construction of such an arrangement is well known in the trade, with the motor 62 output member shaft serving to spin a cutting blade below the lawnmower's deck and thereby cutting the grass 63. A long extension cord 65 typically plugs into an outdoor outlet 67 or the like provided on a building 70.

Figure 3:
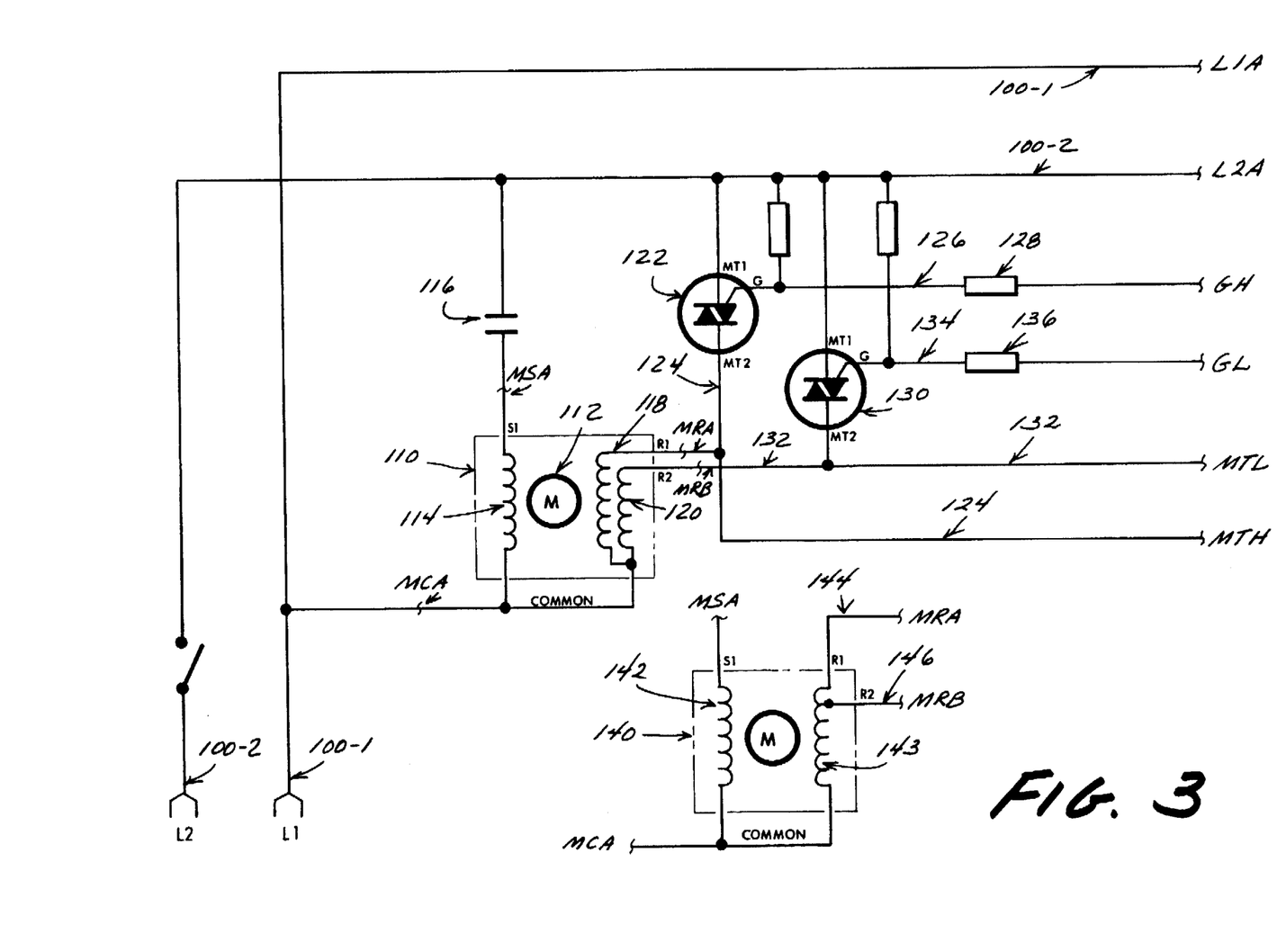
FIG. 3—Power circuitry for two forms of motors useful with my invention.

In FIG. 3 AC power is supplied on lines 100-1,100-2 (the L1,L2 inputs). Line 100-1 is shown as being the common line, while line 100-2 feeds through a switch. A motor 110 shown as a permanent capacitor star (PCS) hookup includes a rotor 112, a start winding 114 and a series coupled start capacitor 116 hooked to terminal S1 of the motor. In this configuration, the motor includes two parallel connected RUN windings. The full-voltage RUN winding 118 couples with terminal R1, while a lesser voltage RUN winding 120 couples with terminal R2. When the supplied AC power at the input L1,L2 is greater than about 105 volts (assuming a 117 volt AC motor), a signal on input terminals GH coupled with gate line 126 via resistor 128 enables a gate portion of the triac thyristor 122 to turn-on the triac thereby coupling the AC power on the line 100-2 with the line 124 and the motor winding 118. Alternatively, when the supplied AC power at the input L1,L2 is less than about 105 volts, a signal on input terminal GL coupled with gate line 134 via resistor 136 enables a gate portion of the triac thyristor 130 to turn-on the triac thereby coupling the AC power on the line 100-2 with the line 132 and the motor winding 120. Since the two windings 118,120 effectively perform in parallel the smaller winding 120 operationally appears equivalent to having a tap on the larger winding 118. The alternative arrangement of a motor 140, including a start winding 142 is shown to include a tapped RUN winding 143. As shown the fill winding extent terminally couples R1 with line 144 and may be hooked into the arrangement of motor 110 by merely reconnecting the lines shown by breakpoints MSA, MRA and MMR. A tap R2 on line 146 is therefore functionally equivalent to the winding 120.

Figure 4:
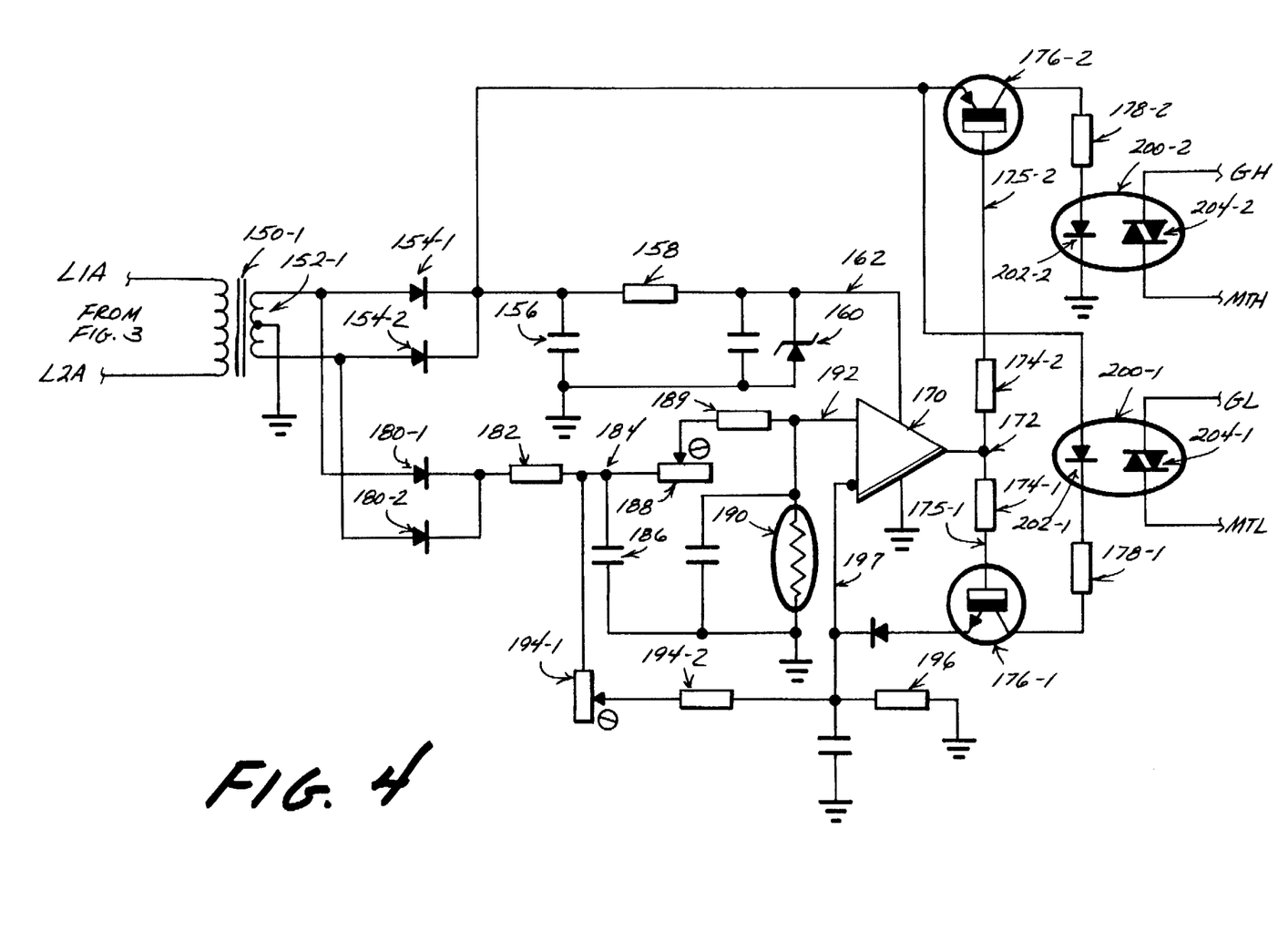
FIG. 4—Power control circuit using self-heating thermoresistive element as integrating power sensor.

The supplied AC power on lines 100-1,100-2 of FIG. 3 couple via connections L1A,L1B with the like connections of FIG. 4 thereby feeding a primary winding of a transformer 150-1. The transformer secondary 152-1 supplies a relatively low voltage (e.g., 36 vols AC, centertapped) to rectifier diodes 154-1,154-2 thereby charging capacitor 156 providing a source of DC voltage coupling through resistor 158 to feed line 162 with a constant DC level that is stablized by a zener diode 160. A comparator (or operational amplifier operated as a comparator) 170 serves as a power level detector. Diodes 180-1,180-2 rectify the transformer secondary 152-1 AC voltage and charge a capacitor 186 through a resistor 182 thereby developing a +DC level on line 184 which is proportional to the supplied AC power level. Waveform of the supplied AC power is less critical in this arrangement. The +DC level on line 184 couples serially with a rheostat 188, a resistor 189 and a negative coefficient thermistor 190 (i.e., a temperature dependent resistor). This is a self heating arrangement for the thermistor 190, whereby the current flow through the rheostat 188 and resistor 189 determines the heating effect relative with variations in the DC level on line 184 introduced by variations in the supplied AC power level. As the DC level on line 184 increases, self heating increases within the thermistor 190 and (in the shown hookup) its resistance value decreases in proportion to the self heating. The line 197, an input of the comparator 170, receives a DC level from a juncture on a voltage divider including series connected rheostat 194-1, resistor 194-2 and resistor 196. With the rheostat 194-1 connected to line 184, as shown, the main signal to which the comparator 170 is responsive is a differential level developed between line 192 and line 197 due to self heating of the thermistor 190. When the supplied AC power is above a predetermined threshold value, e.g. 105 volts as previously said, the level on line 192 drops below that on line 197 and the comparator output 172 drops LOW. As a result, current is drawn through the emitter and base portion of a transistor 176-2 via resistor 174-2. This forward biases the transistor 176-2 drawing substantial current through resistor 178-2 and an light emitting diode (LED) portion 202-2 of an optocoupler 200-2. As a result, thyristor 204-2 turns-on and with the GH and MTH connections coupled to similar connections in FIG. 3, triac 122 of FIG. 3 turns-on.

When the supplied AC power is lower than the said 105 volt level, the output line 172 from the comparator increases to a HIGH state, shutting transistor 176-2 off and drawing current through the emitter and base portion of transistor 176-1, turning it on and thereby drawing substantial current through a resistor 178-1 and LED 202-1 portion of an optocoupler 200-1. As a result, thyristor element 204-1 turns-on and the connections GL and MTL coupled with like connections of FIG. 3 serve to turn the triac 130 on.

Figure 5:
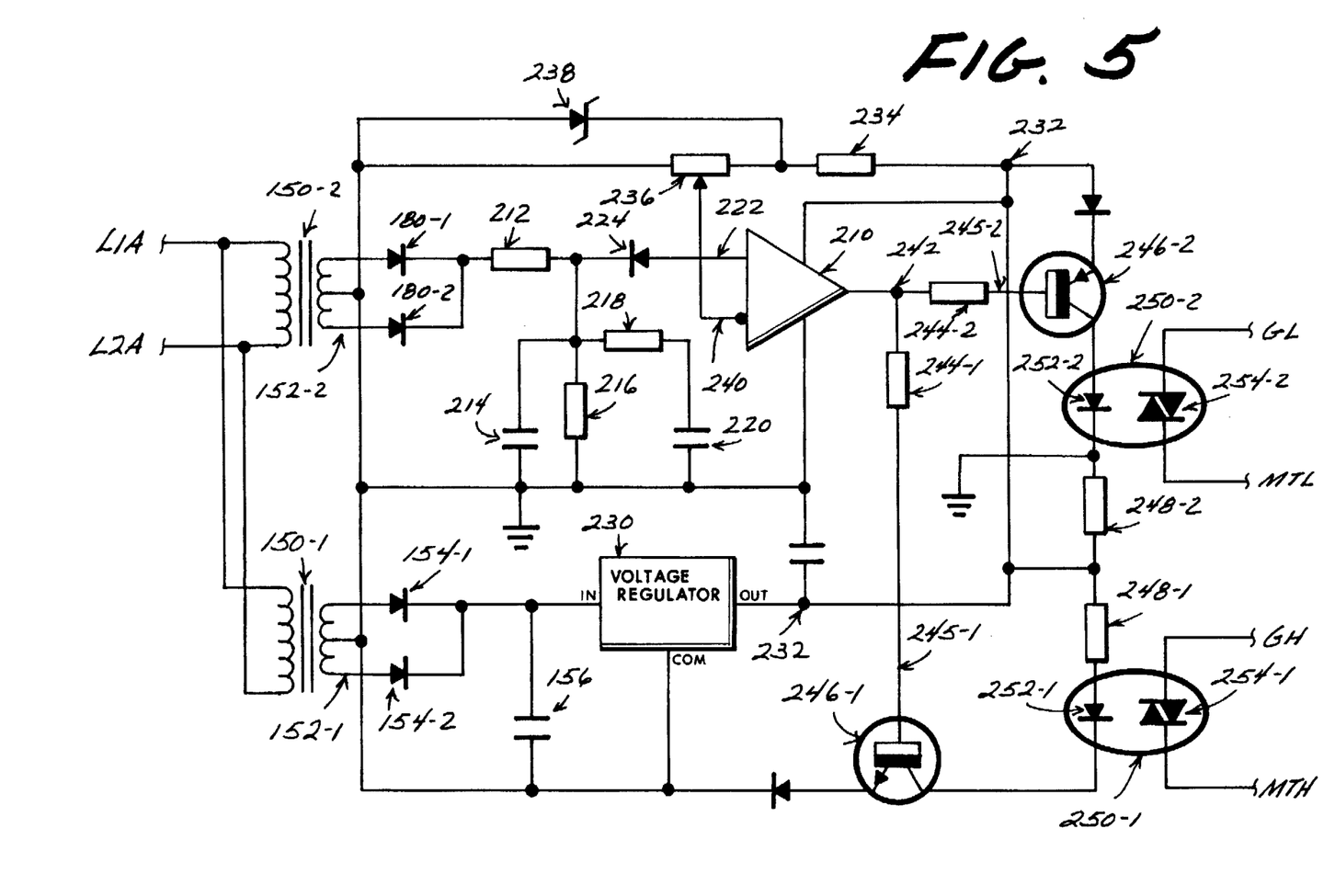
FIG. 5—Power control circuit using integrated capacitor charge for power sensor.

In FIG. 5 I show the supplied AC power coupled from FIG. 3 through connections L1A,L1B. The transformer 150-1 including the secondary winding 152-1 and rectifier diodes 154-1,154-2 serve to develop a DC potential across the capacitor 156 which couples to the input of a voltage regulator 230. The result is a +DC level on line 232 having a stable value of, for example, +12 volts DC. Another transformer 150-2 including a secondary winding 152-2 couples through two rectifier diodes 180-1,180-2 having their respective cathodes coupled seriately with a resistor 212. This resistor 212 is relatively high in value. The current flow through the resistor serves to charge a capacitor 216 and the combination is designed to have a time constant of at least several centiseconds. As a result, the DC level of the charge appearing across the capacitor 216 is in good proportion to the immediate level of the supplied AC power. A resistor 214 merely drains-off the residual charge capacitor 214 in absence of current through resistor 212. Resistor 218 together with capacitor 220 comprise the heart of the integrational function of this particular embodiment. The time constant afforded by the resistor 218 to charge the capacitor 220 is ordinarily determined to be several deciseconds, with the result that the signal on line 222 is a goodly representation of average immediate level of the supplied AC power. If a sudden drop in the supplied AC power occurs, a diode 224 serves to more quickly discharge the potential of capacitor 220 thereby dropping the signal level on line 222.

A voltage divider comprising resistor 234 and potentiometer 236 serves to provide a level on line 240 having a substantially constant, albeit adjustable, value. The level is stabilized by a zener diode 238. When the supplied AC power level is about normal, e.g. above 105 volts AC as previously exampled, the level on line 222 exceeds that set on line 240. This increase produces a HIGH level on the output line 242 of a comparator 210. The HIGH level produces a flow of current through resistor 244-1 and the level on line 245-1 produces forward bias through the base and emitter portion of a transistor 246-1. As a result collector current is drawn through the resistor 248-1 and LED 252-1 portion of an optocoupler 250-1. Thyristor 254-1 is resultingly turned ON and the GH,MTH connections mated with like connections of FIG. 3 serve to turn the triac 122 ON. A drop in the supplied AC power brings about a reduction in the level on line 222 below that set on the line 240 and as a result, the comparator 210 output line 242 is drawn LOW. Transistor 246-1 is turned off. Current is drawn through a resistor 244-2 and the base and emitter portion of a PNP transistor 246-2. As a result collector current is drawn through the resistor 248-2 and LED 252-2 portion of an optocoupler 250-2. Thyristor 254-1 is resultingly turned ON and the GL,MTL connections mated with like connections of FIG. 3 serve to turn the triac 130 ON. Adjustment of the potentiometer 236 enables adjustment of the switchover level, relative with the supplied AC power level and an available tap voltage level on the motor.

Figure 6:
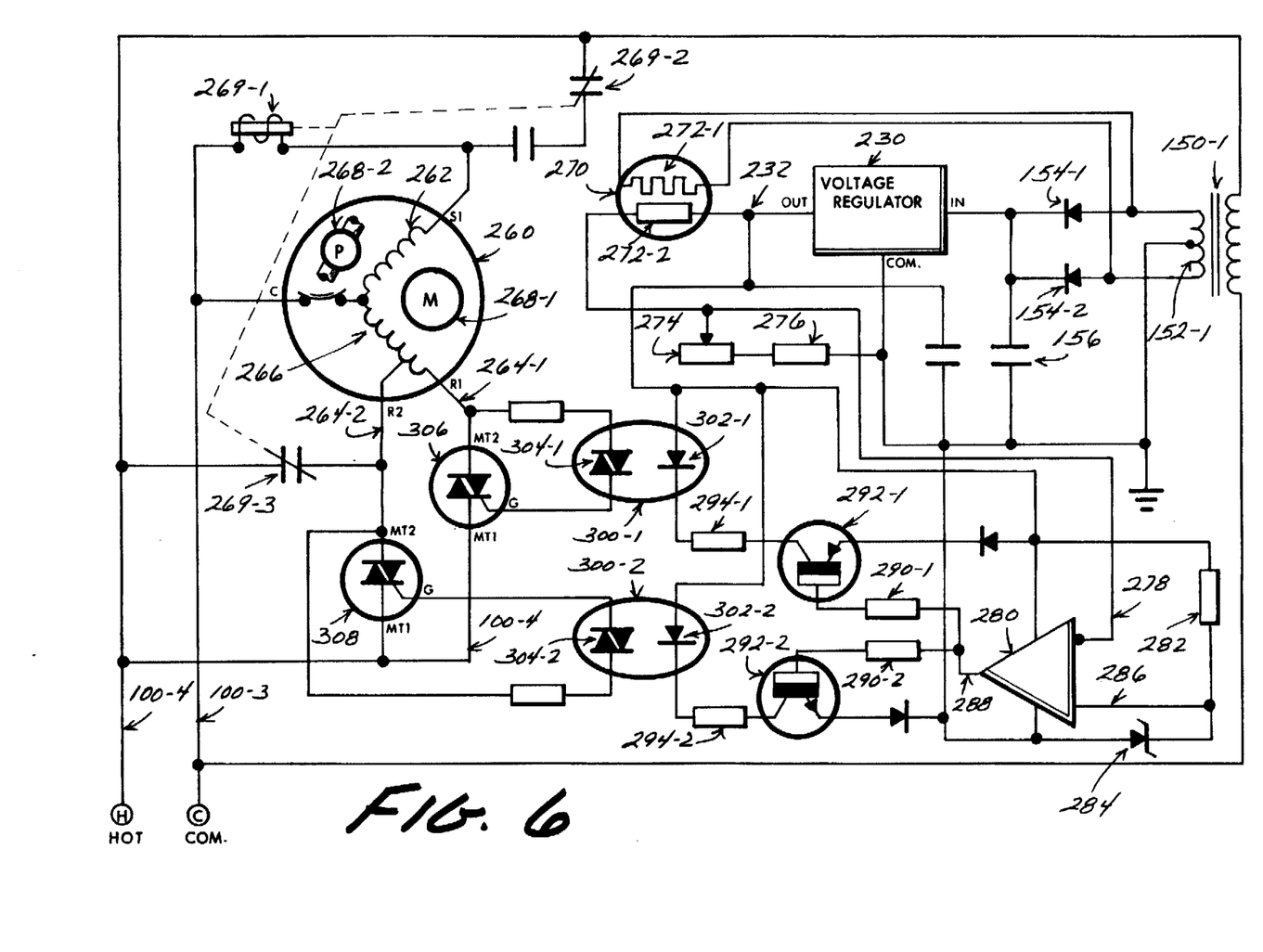
FIG. 6—Motor control useful with refrigerator or air conditioner having heater warmed thermoresistive element as integrating power sensor.

In FIG. 6 I show AC power input to lines 100-3,100-4. In this hookup, the AC power available at the COM and HOT terminals is often less than optimal. Such might be the case when the power is derived from an outlet in a building having tired, overloaded or inadequate wiring. It may also be the case when the AC power is drawn through a lossy extension cord of excessive length or undersized conductor guage, or both. This particular arrangement shows the motor construction 260 to be a hermetic motor and compressor unit typical of what is widely used in refrigeration equipment and air conditioners. Such apparatus suffers from lower than design center available line voltage, with the result that the units operation falters or even motor burnout might occur. With my invention, the motor unit 260 includes a start winding 262, a tapped run winding 266 and a rotor member 268-1 coupled with a compressor pump 268-2. The transformer 150-1 provides an AC power value from its secondary winding 152-1 that excites a heater element 272 closely coupled with a positive temperature coefficient thermistor 272-2. As a result, when the AC power level increases, the heater 272-1 warms the thermistor and the thermistor resistance increases. The thermistor element 272-2 is hooked between the +DC line 232 and with a series arrangement of a rheostat 274 and resistor 276 to ground, forming a voltage divider. A juncture 278 between the thermistor and the rheostat couples with an inverting input of a comparator 280. The other comparator input line 286 is provided with a constant +DC reference level developed across a zener diode 284 which is supplied with current through resistor 282. Having been warmed, the thermistor produces an increase in the signal level on line 278 to a value higher than the reference value on line 286. The result is that the output line 288 of the comparator is driven LOW and current flow through resistor 290-1 produces forward bias and effects turn-on of the PNP transistor 292-1. Collector current is drawn through resistor 294-1 and LED 302-1, effecting turn-on of the thryistor 304-1 portion of an optocoupler 302-1. Subsequently, triac 306 is turned on and tap connection R1, line 264-1, is coupled with the AC line 100-4. Conversely, when the supplied level of AC power drops below a predetermined level, e.g. the earlier said 105 volts by way of mere example, the heater 272-1 cools down and the thermistor 272-2 resistance decreases, increasing the effective signal level on line 278 input of the comparator. When this increased level exceeds the reference level on line 286, the output line 288 of the comparator is driven HIGH. Transistor 292-1 turns off. Current flow is introduced through resistor 290-2 and the base of the NPN transistor 292-2. As a result, collector current is drawn through resistor 294-2 and LED 302-2 portion of an optocoupler 300-2, turning the thyristor portion 304-2 ON. As a result, triac 308 is turned ON and the lower level of the supplied AC power on line 100-4 is coupled with the R2 tap via line 264-2 to increase magnetic field strength in the motor, although the available AC power level has decreased. I also show a potential operated starting relay 269-1 including normally closed contact sets 269-2,269-3. The contact set 269-2 serves the usual motor starting function in combination with the start winding 262 and a capacitor 263, while the other contact set 269-3 may shunt AC power directly to the RUN winding during startup thereby shielding the triac 308 from having to pass the starting current surge.

Although I teach several forms for my invention as depicted in the accompanying figures and description, this shall not be construed as limiting the scope of my invention to these particular combination of elements or structural configurations. It is the utter essence of my invention to teach an electric induction motor control method which may enable operation of the motor from a very poorly stabilized voltage source with minimal sacrifice of motor performance and to give example of apparatus suitable for attaining practical embodiment of the method having economical utility for consumer applications. It is necessary to realize that the control apparatus might take other forms which can be differently engineered to suit a particular application without departing from the fundamental spirit of my invention. Measurement of the supplied level of AC power may also be obtained by others using different hardware approaches without departing from the substance of my invention. It is furthermore necessary to realize that when I give specific operating conditions for representative operation of portions of the hardware associated with my apparatus or when I recite particular functional conditions, these definitions are guidelines which may serve to example the art which I have developed to others but should not be construed as limiting or regulatory regarding the operative essence of my invention. For example, although I mention an AC supply providing 117 volts, 60 Hertz power typical of the United States, this does not preclude other AC voltage levels of 208 volts, 230 volts, 240 volts and similar values when their availability is dominant, including the 50 hertz power supplied in Europe and other parts of the world. A skilled artisan will readily understand that my invention is not narrowly limited to the particular kinds of induction motors applications which I discuss, but the produced operational improvements afforded by my invention may be more broadly extended to benefit virtually any type of induction motor application requiring uncompromised full power operation from a poorly regulated source of AC power. I anticipate that mere obvious variations of my invention's form may be implemented which can satisfy the operational aspects of the functional elements of my invention and such variant choices shall be considered as ordinary engineering expedients and fully within the scope of my appended claims.

What I claim for my invention is:

1. A control method for reducing variation of a.c. induction motor rotor output member torque in presence of an inconstant level of a.c. electric power supplied to field coil winding of the induction motor, comprising steps of:

measuring an immediate level of the supplied a.c. electric power;

devising the induction motor's said field coil winding to include a plurality of electric power level tap selections;

automatically selecting the field coil winding said electric power level tap which most nearly matches the measured immediate level of the supplied a.c. electric power;

coupling the supplied a.c. electric power between the automatically selected said electric power level tap and an antithetical end of the field winding.

2. The control method of claim 1 comprising further steps of:

determining an immediate voltage level of the supplied a.c. electric power;

said automatically selecting a coupling of the supplied a.c. electric power wit a lower voltage level said electric power level tap upon the determination of said immediate voltage level having decreased below a threshold level; and, delaying said automatic selecting of the coupling of the supplied a.c. electric power with a higher voltage level said electric power level tap upon the determination of said immediate voltage level having increased above the threshold level.

3. The control method of claim 1 further comprising further steps of:

impeding flow of the supplied a.c. electric power between a source and the field coil winding through an intervening coupling of a substantially long and inherently lossy extension cord;

developing a voltage drop across the length of the long and inherently lossy extension cord; and increasing the voltage drop relative with an increase in mechanical loading coupled with the a.c. induction motor's said output member.

4. The control method of claim 1 further comprising steps of:

engineering a first said field coil winding said electric power level tap to operate with a predetermined maximal level of said supplied a.c. electric power;

engineering at least a second said field coil winding said electric power level tap to operate with a predetermined first increment less available electric power level than that of a maximal level of available electric power and thereby maintain the about maximum level of said output member torque;

said automatically selecting the first said field coil winding's said electric power level tap when the measured immediate level of the supplied a.c. electric power exceeds a second electric power level intermediate between that of the first and the second said field winding electric power level taps; and, said automatically selecting the second said field coil winding's said electric power level tap when the measured immediate level of the supplied a.c. electric power is determined to be less than the second electric power level.

5. The control method of claim 4 further comprising steps of:

engineering at least a third said field coil winding said electric power level tap to operate with a second increment less available electric power level than that of the maximal available electric power level; and, said selecting the third said field coil winding's said electric power level tap when the measured available level of a.c. electric power is less than a third available electric power level intermediate between that of the second and the third said field coil windings' said electric power level taps.

6. The control method of claim 1 wherein the automatic selecting of the field coil winding said electric power level taps comprises a further step of switching between the electric power level taps near a.c. electric power cycle zero-crossover of the supplied a.c. electric power.

7. The control method of claim 1 whereby said measuring the immediate electric power level value comprises a further step of integrating voltage phase level of the supplied a.c. electric power over a period of time comprising a plurality of a.c. electric power cycles.

8. An operating method providing field excitation control of an induction motor in presence of substantial variation in voltage level of a.c. operating level electric power supplied to input terminals of the induction motor, comprising steps of:

measuring the input terminal voltage;

tapping the induction motor's field winding with a plurality of incremental voltage level taps;

automatically selecting the incremental voltage level taps on the motor's field winding which are determined to correlate with an immediate level of the measured said input terminal voltage; and, feeding the a.c. operating level power between the selected said incremental voltage level tap and antithetical end of the field winding.

9. The operating method of claim 8 comprising a further step of introducing the substantial variation in voltage level as an intrinsic result of delivering the a.c. operating level electric power through a substantially long and inherently lossy extension cord having a far end coupled with the induction motor's said input terminals and a near end coupled with a relatively constant source of a.c. electric power.

10. The operating method of claim 8 comprising the step of introducing the substantial variation in voltage level as a result of power level deviations intrinsic with a source of a.c. electric power delivering the a.c. operating level electric power.

11. The operating method of claim 8 comprising the steps of:

sensing a selection of a lower voltage tap in response to a measured drop in the input terminal voltage;

measuring an increase in the input terminal voltage; and, delaying the automatic selection of a higher voltage tap for a predetermined period of time usually predetermined between about 1 and 10 seconds subsequent to the measured said increase in the input terminal voltage.

12. The operating method of claim 8 whereby said measuring the input terminal voltage includes steps of:

rectifying a portion of the input terminal voltage into a pulsating direct current (d.c.) signal; and, integrating the pulsating d.c. signal to produce the immediate level to have a value proportional to the input terminal voltage.

13. The operating method of claim 8 whereby said measuring the input terminal voltage includes steps of:

exciting a heating element from the a.c. operating level electric power;

thermally coupling the heating element with a temperature dependent resistor;

seriately coupling terminals of a fixed value resistor and the temperature dependent resistor between terminals of a d.c. power source;

heating the temperature dependent resistor through the termal coupling with the heating element to an extent proportional to the a.c. operating level electric power applied to the heating element; and, determining a measurable d.c. signal at the juncture between the fixed value resistor and the temperature dependent resistor expressing a value proportional to the input terminal voltage.

14. Induction motor and control means which may operate from an inconstant source of a.c. electric power while maintaining a relatively stable level of magnetic field excitation in the motor stator, comprising:

induction motor means including a multi-tapped field winding means;

means for measuring electric power level of the inconstant source of a.c. electric power supplied to input terminal means of the induction motor means;

means for coupling a first connective portion of the input terminal means with an antithetical common end of the multi-tapped field winding means; and, means for automatically selecting coupling between a second connective portion of the input terminal means and a concurrent tap on the multi-tapped field winding relative with an immediate value of the measured electric power level.

15. The inconstant source of a.c. power of claim 14 comprising a substantially long and inherently lossy extension cord coupled between a stable source of a.c. electric power and the input terminal means.

16. The selecting and momently reselecting means of claim 14 comprising:

thyristor switch means coupled between each said tap on the multitapped field winding and the second connective portion of the input terminal means; and, driver means coupled with the thyristor switch means and the electric power level measuring means to produce conduction through the thyristor switch means portion coupled with the concurrent tap.

17. The selecting and momently reselecting means of claim 14 comprising:

bilateral semiconductor switch means coupled between each said tap on the multitapped field winding and the second connective portion of the input terminal means; and, driver means coupled with the bilateral semiconductor switch means and the electric power level measuring means to produce conduction through the bilateral semiconductor switch means portion coupled with the concurrent tap.

18. The measuring means of claim 14 comprising a means for integrating voltage phase electric power level levels over a period of at least several a.c. electric power cycles.

19. Measuring means of claim 14 comprising:

means for rectifying a portion of the a.c. electric power supplied to the input terminal means into a pulsating d.c. signal; and, means for integrating the pulsating d.c. level to produce the measured electric power level signal to have a value proportional to the supplied a.c. electric power.

20. Measuring means of claim 14 comprising:

a fixed value resistor means coupled seriately with a temperature dependent resistor means and between terminals of a d.c. power source;

a heating means electrically coupled with the supplied a.c. electric power and thermally coupled with the temperature dependent resistor means; and, determining means effective for measuring a level of d.c. signal appearing at a juncture between the fixed value resistor means and the temperature dependent resistor means and producing a measure of the immediate value of the supplied a.c. electric power.

* * * * *